US 7,508,622 B2
Mar. 24, 2009

(12) United States Patent
Martin et al.

(54) ELECTRONIC DATA CONNECTOR OF DATA STORAGE CARTRIDGE AND ASSOCIATED READ/WRITE DEVICE

(75) Inventors: Robert C. Martin, St. Paul, MN (US); Peter L. Groel, Longmont, CO (US); Jack L. Marion, McFaddon, WY (US); Leo W. Spychalla, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 491 days.

(21) Appl. No.: 10/928,486

(22) Filed: Aug. 27, 2004

(65) Prior Publication Data
US 2006/0044674 A1 Mar. 2, 2006

(51) Int. Cl.
*G11B 17/00* (2006.01)
(52) U.S. Cl. ..................... 360/97.01; 439/79
(58) Field of Classification Search .............. 360/97.01; 439/55–85, 620.18
See application file for complete search history.

(56) References Cited

U.S. PATENT DOCUMENTS

| 4,179,178 | A | * | 12/1979 | Bachman et al. ............... 439/59 |
| 5,297,124 | A | * | 3/1994 | Plotkin et al. ................. 360/49 |
| 5,420,733 | A | | 5/1995 | Knighton et al. .......... 360/97.01 |
| 5,831,790 | A | | 11/1998 | Iftikar et al. .............. 360/99.12 |
| 6,061,232 | A | | 5/2000 | Ho .............................. 361/685 |
| 6,079,999 | A | | 6/2000 | Terry et al. .................. 439/326 |
| 6,108,162 | A | * | 8/2000 | Amirkiai et al. .......... 360/97.01 |
| 6,327,814 | B1 | | 12/2001 | Tsujino et al. ............... 439/374 |
| 6,464,509 | B1 | | 10/2002 | Emberty et al. ............... 439/39 |
| 6,520,809 | B1 | | 2/2003 | Son ............................. 439/679 |
| 6,540,528 | B2 | | 4/2003 | Brodsky et al. ............... 439/67 |
| 6,650,961 | B2 | | 11/2003 | Deckers ...................... 700/213 |
| 6,693,859 | B1 | | 2/2004 | Kulakowski et al. ..... 369/30.43 |
| 6,697,214 | B2 | | 2/2004 | Dimitri et al. ............. 360/97.01 |
| 6,722,895 | B1 | | 4/2004 | Brodsky et al. ............... 439/67 |
| 6,731,455 | B2 | | 5/2004 | Kulakowski et al. .......... 360/92 |
| 6,771,448 | B2 | | 8/2004 | Blair et al. .................... 360/69 |
| 6,783,076 | B2 | * | 8/2004 | Kondo et al. ................ 235/492 |
| 6,813,117 | B2 | | 11/2004 | Blair et al. .................. 360/132 |
| 6,819,524 | B2 | | 11/2004 | Kulakowski et al. .......... 360/92 |
| 6,826,004 | B2 | | 11/2004 | Albrecht et al. ............... 360/69 |
| 6,837,718 | B2 | | 1/2005 | Brodsky et al. ............... 439/67 |
| 6,850,380 | B2 | | 2/2005 | Basham et al. ................ 360/69 |
| 6,854,982 | B2 | | 2/2005 | Brodsky et al. ............... 439/67 |
| 6,867,942 | B2 | | 3/2005 | Albrecht et al. ............... 360/69 |
| 2001/0023140 | A1 | * | 9/2001 | Saijo et al. .................... 439/71 |
| 2003/0021058 | A1 | * | 1/2003 | Gallo et al. .............. 360/97.01 |
| 2003/0022533 | A1 | | 1/2003 | Joo ............................... 439/67 |

(Continued)

OTHER PUBLICATIONS

U.S. Appl. No. 10/385,786 entitled "System Having Tape Drive Emulator and Data Tape Cartridge Housing Carrying Multiple Disk Drives," Yip et al., filed Mar. 11, 2003.

(Continued)

*Primary Examiner*—Angel A. Castro
(74) *Attorney, Agent, or Firm*—Eric D. Levinson

(57) ABSTRACT

A data storage cartridge comprising a hard drive and a cartridge housing. The hard drive includes a non-tape storage medium and an electronic data connector including a plurality of connection pads for accessing the non-tape storage medium. The cartridge housing substantially encloses the hard drive. The plurality of connection pads are transversely accessible by a cartridge drive.

13 Claims, 11 Drawing Sheets

U.S. PATENT DOCUMENTS

| | | | |
|---|---|---|---|
| 2003/0135672 A1 | 7/2003 | Yip et al. | 710/72 |
| 2004/0097122 A1 | 5/2004 | Garrett et al. | 439/378 |
| 2004/0098244 A1 | 5/2004 | Dailey et al. | 703/24 |

OTHER PUBLICATIONS

U.S. Appl. No. 10/725,232 entitled "Data Storage Cartridge with Hard Drive and Door," Spychalla, filed Dec. 1, 2003.

U.S. Appl. No. 10/725,259 entitled "Data Storage Cartridge with Hard Drive and Alignment Feature," Spychalla, filed Dec. 1, 2003.

U.S. Appl. No. 10/881,666 entitled "Non-Tape Data Storage Cartridge with Handling Feature and Associated Cartridge Drive," Ridl, filed Jun. 30, 2004.

* cited by examiner

ELECTRONIC DATA CONNECTOR OF DATA STORAGE CARTRIDGE AND ASSOCIATED READ/WRITE DEVICE

THE FIELD OF THE INVENTION

The present invention generally relates to a data storage cartridge and an associated cartridge drive. More particularly, the present invention relates to a data storage cartridge for housing a non-tape storage medium and an electrical connection between the data storage cartridge and the associated tape drive.

BACKGROUND OF THE INVENTION

Data storage tape cartridges have been used for decades in the computer, audio, and video fields as a means for storing electronic files. The data storage tape cartridges continue to be a popular form of recording large volumes of information for subsequent retrieval and use, particularly in a library setting. Automated, data storage tape cartridge libraries provide access to vast amounts of electronic data by storing and managing data storage tape cartridges.

In a conventional, automated, data storage tape cartridge library system, an automation unit, such as a robotic arm or other mechanism, typically services a plurality of data storage tape cartridge locations. The automation unit selectively retrieves a data storage tape cartridge from one of the storage locations and loads the retrieved data storage tape cartridge into a designated tape drive. The tape drive reads data from or writes new data to the data storage tape cartridge. When the tape drive is finished with the data storage tape cartridge, the automation unit retrieves the data storage tape cartridge from the tape drive and returns the data storage tape cartridge to the assigned storage location. A host computing system typically communicates with the library controlling unit to control the operation of the automated cartridge library. In this way, a large number of data storage tape cartridges are automatically accessible by one or more tape drives.

To manipulate a data storage tape cartridge, the automation unit typically includes an interface, such as a gripper on a robotic arm, that engages the data storage tape cartridge and allows the automation unit to convey and manipulate the orientation of the data storage tape cartridge. Because the data storage tape cartridges must be positioned in a precise manner for the robotic arm to grasp and position them correctly, the data storage tape cartridges and the storage locations are constructed with exact dimensions. Accordingly, the data storage tape cartridges that the library system houses typically have substantially similar, if not identical, form factors in order to be properly received by the interface of the automation unit. Notably, during the life of a typical data storage tape cartridge within the library system, the data storage tape cartridge undergoes a plurality of connection and disconnection (i.e., insertion and removal) cycles with the one or more associated tape drives.

Although conventional, automated libraries provide access to vast amounts of information, the data storage tape cartridges do not allow for true random access of files stored on the data storage tape cartridges. In particular, a conventional data storage data tape cartridge consists of a tape, i.e., an elongated flexible medium having a magnetic recording layer, wound on one or more wheels or hubs. Data is recorded and retrieved by inserting the data storage tape cartridge within a tape drive and passing the recording medium in front of one or more read/write heads. The tape drives are usually streaming devices in which data is recorded in a serpentine fashion as the tape streams back and forth. In particular, the tape drive typically writes the data along a number of tracks that span the length of the medium. For this reason, data storage tape cartridges can be viewed as sequentially storing the data in a linear format.

The linear data storage format prevents true random access to individual files. In particular, a tape drive must scan through the entire length of the tape until the appropriate file mark is identified, thereby increasing the file retrieval time. Due to the lack of true random access to individual files stored within the data storage tape cartridges and the affinity for the pre-existing automated, data storage tape cartridge library systems, a need exists for a data storage cartridge configured to house and protect a random access storage medium and yet be compatible with conventional, automated, data storage tape cartridge library systems.

However, typical connections with many non-tape storage mediums are not configured to withstand a plurality of connection and disconnection cycles. For example, hard drives are typically electrically connected to other interfaces by sliding connection pins over the hard drive connection pads. Repeated sliding of the connection pins over the pads may eventually wear away the conductive plating on the pads and, thereby, gradually disintegrate the integrity of the electrical connection. Therefore, a need exists to form a selective electrical connection between a non-tape storage medium housed within a data storage cartridge and an associated cartridge drive capable of maintaining its integrity through a plurality of connection and disconnection cycles.

SUMMARY OF THE INVENTION

One aspect of the present invention relates to a data storage cartridge comprising a hard drive and a cartridge housing. The hard drive includes a non-tape storage medium and an electronic data connector including a plurality of connection pads for accessing the non-tape storage medium. The cartridge housing substantially encloses the hard drive. The plurality of connection pads are transversely accessible by a cartridge drive.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

Figure 1:
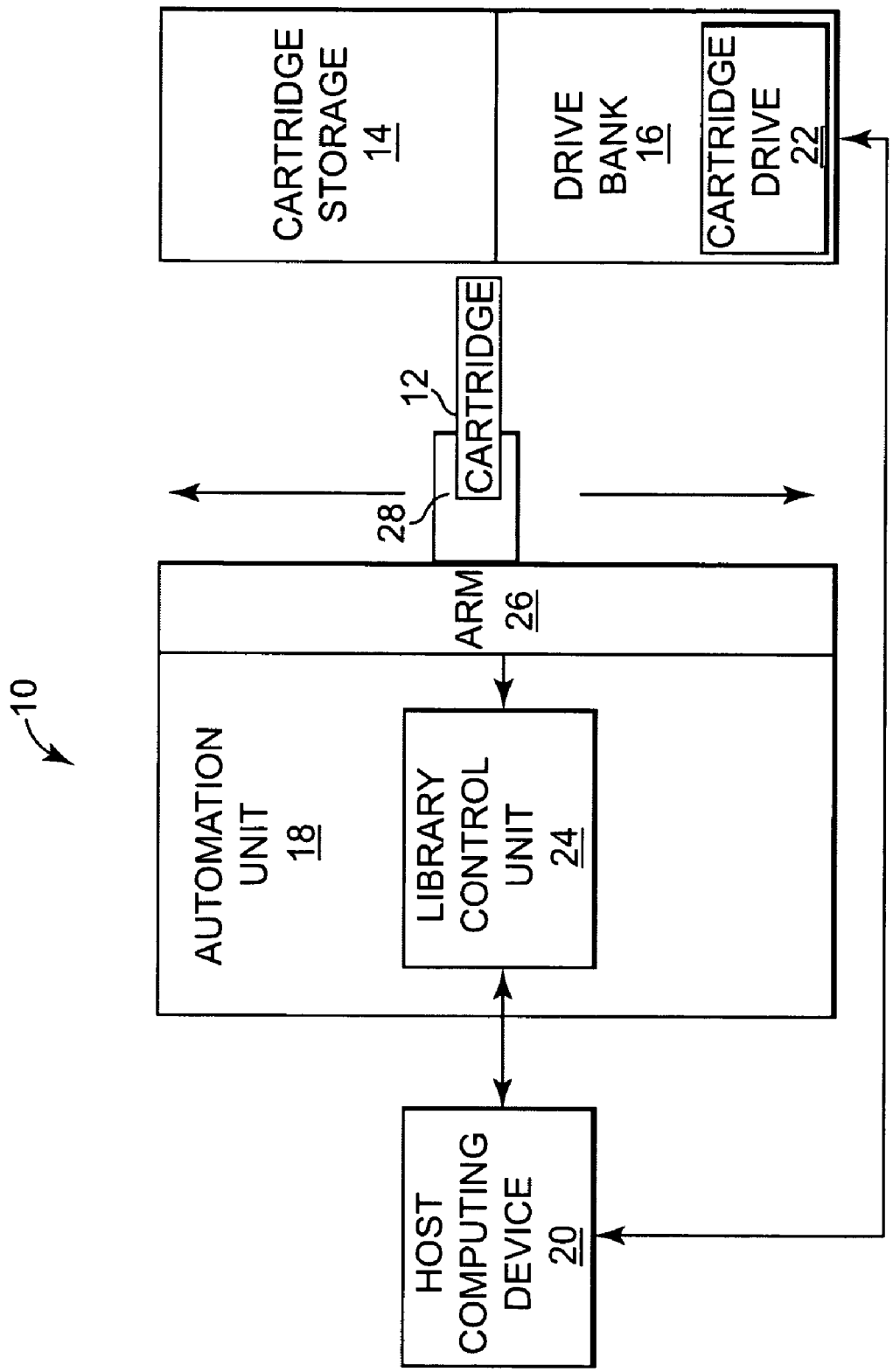
FIG. 1 is a block diagram of one embodiment of an automated library system according to the present invention.

An exemplary embodiment of an automated library system 10 containing and utilizing at least one data storage cartridge 12 housing a non-tape storage medium 72 (generally indicated in FIG. 2) according to the present invention is generally illustrated in FIG. 1. The automated library system 10 includes a cartridge storage unit 14, a drive bank 16, an automation unit 18, and a host computing device 20. Generally, the host computing device 20 signals the automation unit 18 to retrieve a particular data storage cartridge 12 from the cartridge storage unit 14. The automation unit 18 removes the particular data storage cartridge 12 from the cartridge storage unit 14 and inserts the particular data storage cartridge 12 into the cartridge drive 22 in the drive bank 16.

When in the cartridge drive 22, the host computing device 20 accesses the particular data storage cartridge 12 to read from or write to the data storage cartridge 12. Upon completion of reading from and/or writing to the data storage cartridge 12, the host computing device 20 signals the automation unit 18, and the automation unit 18 returns the particular data storage cartridge 12 to the cartridge storage unit 14. As such, the data storage cartridges 12 in the automated library system undergo a number of connection and disconnection cycles with the cartridge drive 22.

The cartridge storage unit 14 provides a plurality of storage cartridge locations (not illustrated) for storage. Each storage location, also referred to as a storage cell, provides storage for a single data storage cartridge 12, and each data storage cartridge 12 has an assigned storage location within the cartridge storage unit 14. In addition, each of the data storage cartridges 12 stored in the cartridge storage unit 14 can include identifying information, such as a label, a barcode, or a radio frequency (RF) tag commonly referred to as radio frequency identification (RFID) tags, by which the automation unit 18 identifies the individual data storage cartridges 12. Due to the use of the automation unit 18 in the automated library system 10, precise dimensions of the cartridge storage unit 14 are required by the automation unit 18 and the need to accurately access a particular storage location. In one embodiment, the cartridge storage unit 14 includes a plurality of conventional, data storage tape cartridges as well as a plurality of data storage cartridges 12.

The drive bank 16 includes at least one, and preferably a plurality, of drive locations (not shown). Each of the drive locations is adapted to receive a cartridge drive, such as a conventional tape drive or a non-tape cartridge drive 22. In one embodiment, the non-tape cartridge drive is configured to read and/or write to data storage cartridge 12. In one embodiment, the non-tape cartridge drive 22 is a tape drive emulator configured to read from data storage cartridge 12 and to present the data in a format similar to that received from a conventional data storage tape cartridge. In one embodiment, the cartridge drives 22 and the conventional tape drives contained within the drive bank 16 are configured to read data from and/or write data to the data storage cartridges 12 and the data storage tape cartridges, respectively, per instructions received from the host computing device 20.

The drive bank 16 is also constructed with precise dimensions as required by the automation unit 18 and the need to accurately access a particular tape drive or cartridge drive 22 within a particular drive location. Each of the tape drives or cartridge drives 22 is connected to the host computing device 20 such that the host computing device 20 can access a data storage tape cartridge or a data storage cartridge 12 via the tape drive or the cartridge drive 22, respectively. In one embodiment, the drive bank 16 only includes the cartridge drives 22. In another embodiment, the drive bank 16 includes at least one conventional tape drive and at least one cartridge drive 22 that is a tape drive emulator.

The automation unit 18 facilitates movement of the data storage cartridges 12 between the cartridge storage unit 14 and the drive bank 16. The automation unit 18 includes a library control unit 24 and a robotic arm 26. The library control unit 24 is configured to receive instruction and direction from the host computing device 20 and to generate signals to activate the automation unit 18 in accordance with the instructions received. In particular, the library control unit 24 interprets storage access requests from the host computing device 20, and provides signals to control the motion and operation of the robotic arm 26. The robotic arm 26 typically includes a gripper 28 to facilitate secure handling of the data storage cartridges 12. The host computing device 20 is any computer system configured to relay access signals from a user (not shown) to the automation unit 18 and to read and to write to the data storage cartridges 12 via the tape drive emulator 22 contained within the drive bank 16.

During use, in response to communication signals from the host computing device 20, the library control unit 24 generates control signals directing the robotic arm 26 to retrieve the appropriate data storage cartridge 12 from the cartridge storage unit 14 and to insert the data storage cartridge 12 into one of the cartridge drives 22 in the drive bank 16. In response to the signals from the library control unit 24, the robotic arm 26 traverses the cartridge storage unit 14 and engages the particular data storage cartridge 12 using the gripper 28. The robotic arm 26 then moves the data storage cartridge 12 to the drive bank 16 to insert the data storage cartridge 12 into one of the cartridge drives 22.

Upon insertion of the data storage cartridge 12 into one of the cartridge drives 22, the host computing device 20 can write data to and read data from the data storage cartridge 12. In one embodiment, the automated library system 10 stores, manipulates, and accesses the conventional, data storage tape cartridges via conventional tape drives contained within the drive bank 16 in a similar manner as the automated library system 10 is described above as storing, manipulating, and accessing the data storage cartridges 12 via the cartridge drives 22. Notably, the data storage cartridge 12 can be used with individual or stand-alone cartridge drives 22 in a similar manner as described above with respect to the cartridge drives 22 that are part of the automated library system 10.

It should be noted that, in one embodiment, in order to be useful with automated library system 10, or with individual cartridge drives 22, the data storage cartridges 12 conform to standard form factors or dimensions of the conventional data storage tape cartridges. Accordingly, the conventional data storage tape cartridges and the data storage cartridge 12 are mechanically indistinguishable by the automation unit 18. In this manner, the mechanical interfaces between the automation unit 18 need not be adapted or upgraded to support the substitution of the data storage cartridges 12 for the typical data storage tape cartridges used in the automated library system 10.

For example, existing robotic arms 26 adapted to grasp and interact with typical data storage tape cartridges will be able to grasp and interact with the data storage cartridges 12 since the two cartridges have similar external dimensions. Therefore, an existing automated library system 10 can replace or supplement traditional tape drives with the cartridge drives 22, more specifically, tape drive emulators, to be able to utilize the data storage cartridges 12 and, thereby, will be able to utilize the efficiencies of the non-tape storage mediums over traditional linear tape storage. In other words, use of the non-tape storage mediums, such as are included in the hard drives 32, will allow the library systems 10 to support true random access to individual files stored within the hard drives 32, thereby decreasing overall file retrieval time.

Figure 2:
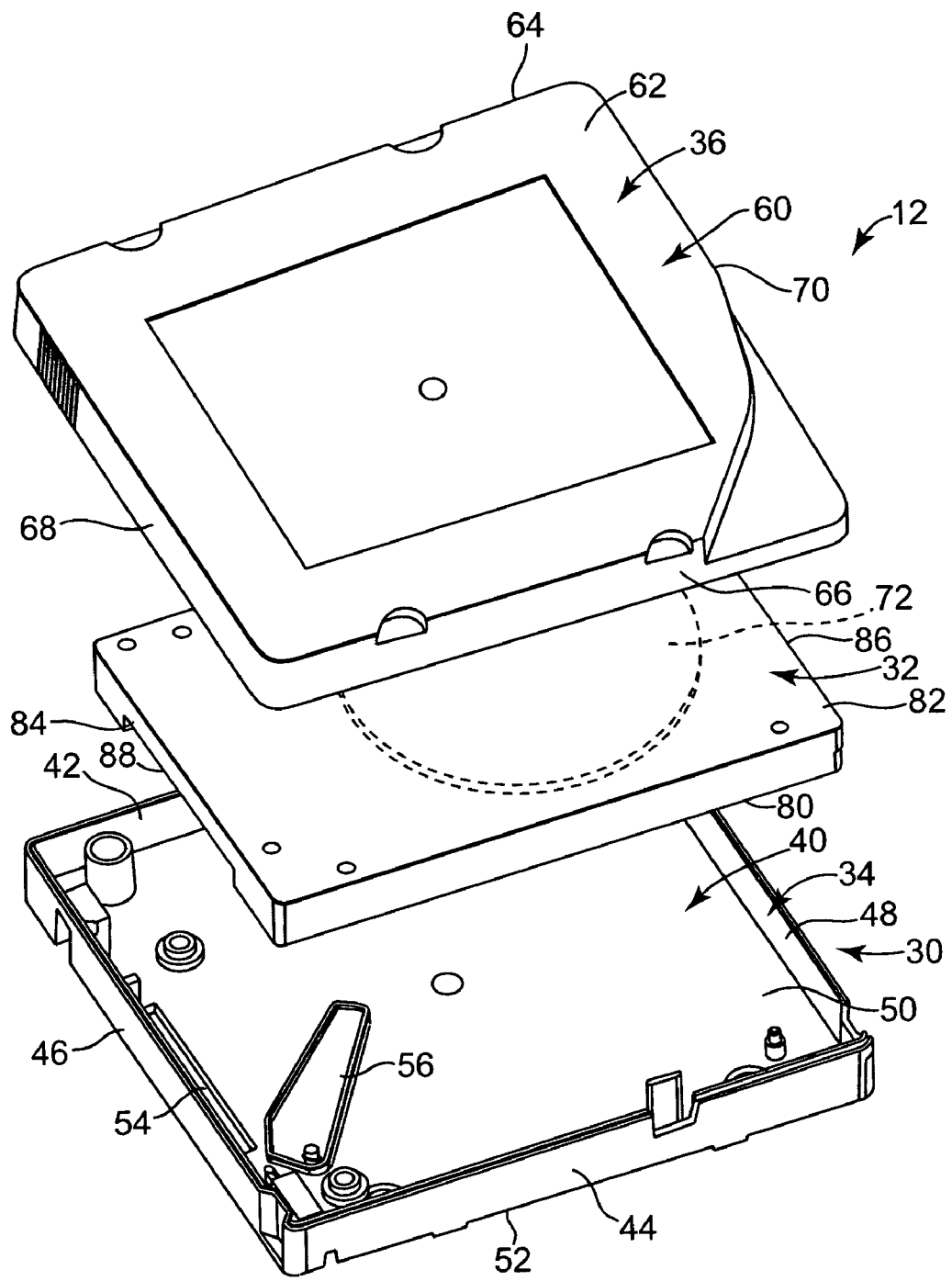
FIG. 2 is perspective, exploded view of one embodiment of a data storage cartridge for use in the automated library system of FIG. 2, according to the present invention.

More specifically, an exemplary data storage cartridge 12 according to one embodiment of the present invention is generally illustrated in the exploded perspective view of FIG. 2. The data storage cartridge 12 includes a housing 30 and a hard drive 32 including a non-tape storage medium 72. The housing 30 includes a first housing section 34 and a second housing section 36 sized to collectively receive and substantially enclose the hard drive 32. In one preferred embodiment, the first housing section 34 serves as a base whereas the second housing section 36 serves as the cover. It should be understood that the directional terminology such as "cover," "base," "first," "second," "up," "down," "horizontal," and "vertical," etc., are used for purposes of illustration only and are in no way limiting.

The first housing section 34 defines a major portion 40, a leading wall 42, a trailing wall 44, a first side wall 46, and a second side wall 48. The major portion 40 is substantially rectangular and substantially planar. As such, the major portion 40 defines an internal surface 50 and an external surface 52 (generally illustrated) opposite the internal surface 50. The walls 42, 44, 46, and 48 each extend from the internal surface 50 of the major portion 40 in a direction opposite the external surface 52. In particular, the trailing wall 44 extends from the major portion 40 opposite the leading wall 42. The side walls 46 and 48 extend from the major portion 40 between the leading wall 42 and the trailing wall 44 opposite one another.

The major portion 40 defines an access window 54 extending through the surfaces 50 and 52 positioned near the first side wall 46 to provide access to the hard drive 32 from a point external to the data storage cartridge 12. In particular, a device external to the data storage cartridge 12, such as the cartridge drive 22 (FIG. 1), can transversely access the hard drive 32 via the access window 54 to read from and write to the hard drive 32. In one embodiment, a door 56 is coupled to the major portion 40 of the first housing section 34 to selectively open and close the access window 54, thereby selectively allowing access to the hard drive 32.

The second housing section 36 of the housing 30 includes a major portion 60, which is substantially planar, defining an exterior surface 62 and an interior surface (not shown) opposite the exterior surface 62. The second housing section 36 further defines a leading wall 64, a trailing wall 66, a first side wall 68, and a second side wall 70 each extending from the major portion 60 opposite the exterior surface 62 about a perimeter of the major portion 60. In particular, the trailing wall 66 is positioned opposite the leading wall 64, and the first and second side walls 68 and 70 extend between the leading wall 64 and the trailing wall 66 opposite one another.

Notably, the second housing section 36 is generally sized similar to the first housing section 34. In addition, the walls 64, 66, 68, and 70 extend from the major portion 60 in a similar manner as the walls 42, 44, 46, and 48 extend from the major portion 40. Accordingly, each of the walls 64, 66, 68, 70 of the second housing section 36 are configured to mate with the walls 42, 44, 46, and 48 of the first housing section 34, respectively, to couple the first housing section 34 to the second housing section 36. In one embodiment, the first and second housing sections 34 and 36 are configured to be coupled at least in part via a snap connection.

In one embodiment, the first and second housing sections 34 and 36 are each formed of a polymeric material. In one embodiment, the first and second housing sections 34 and 36 are each formed by injection molding a suitable material, such as polycarbonate. Alternatively, other materials and/or manufacturing techniques can be employed to form the first and second housing section 34 and 36.

In one preferred embodiment, the housing 30 has a length (i.e., a dimension along a direction parallel with the leading walls 42 and 64) of approximately 4.15 inches (105.4 mm), a width of approximately 4.01 inches (102 mm), and a height of approximately 0.85 inch (21.5 mm), which is typical for a conventional data tape cartridge. In other embodiments, the external dimensions of the housing 30 conform to one of a number of industry-standard form factors, such as the standard form factors of the Black Watch™ 9840 and the Royal Guard™ 3480, 3490E, 3490EL, and 9490EE magnetic storage tape cartridges manufactured by Imation Corp. of Oakdale, Minn.

As illustrated in FIG. 2, the hard drive 32 is generally rectangular in structure and sized and shaped to fit within the housing 30, more particularly between the first housing section 34 and the second housing section 36 of the housing 30. As described above, the hard drive 32 includes the non-tape storage medium 72, which may take the form of or include a variety of storage media, such as a disc-shaped magnetic storage medium, a solid-state storage medium, an optical storage medium, a magneto-optical storage medium, and a holographic storage medium. The solid-state storage medium may be any non-volatile memory such as an erasable programmable read-only memory (EPROM), an electrically erasable programmable memory (FLASH memory) or the like. In a preferred embodiment, the non-tape data storage medium 72 is a random access storage medium.

Figure 3:
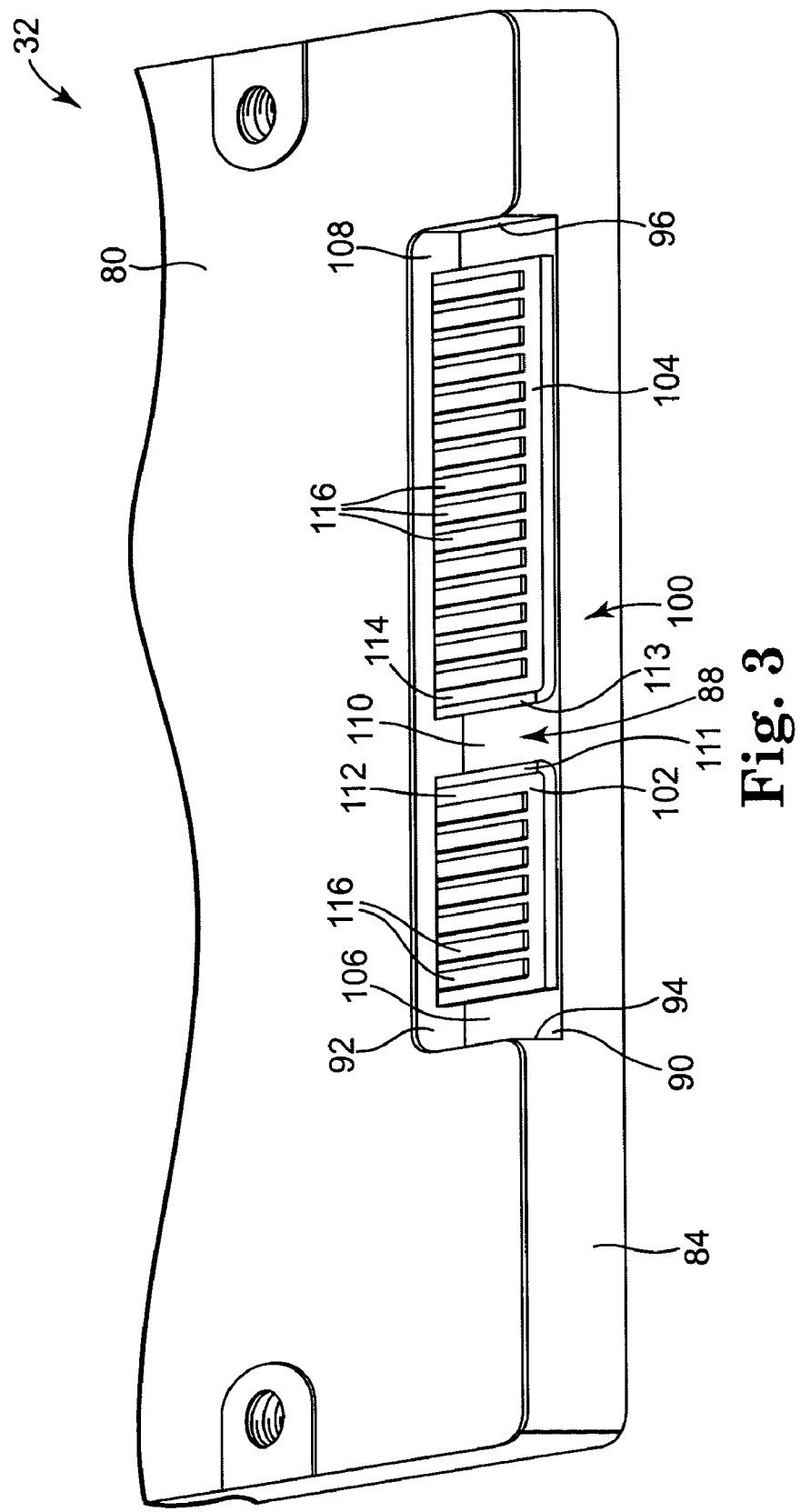
FIG. 3 is a bottom perspective view of one embodiment of a non-tape storage medium of the data storage cartridge of FIG. 2.

In one embodiment, the hard drive 32 further defines a first surface 80, a second surface 82 opposite the first surface 80, a first side wall 84, and a second side wall 86 opposite the first side wall 84. The first and second side wall 84 and 86 each extend between the surfaces 80 and 82. A generally elongated and rectangular cavity 88 is formed from and through the first side wall 84 to and through the first surface 80. With this in mind and additionally referring to FIG. 3, a first cavity wall 90 extends from the first side wall 84 parallel with the first surface 80. A second cavity wall 92 extends from the first surface 80 parallel with the first side wall 84 to intersect with the first cavity wall 90. The cavity defines a first end 94 and a second end 96 opposite the first end 94.

The hard drive 32 includes an electronic data connector 100 coupled within the cavity 88 and configured to provide electronic access to the information stored within the hard drive 32, more particularly, stored on the non-tape storage medium 72. In one embodiment, the electronic data connector 100 is an advanced technology attachment (ATA) connector or a serial advanced technology attachment (SATA) connector. In one embodiment, the electronic data connector 100 includes a first platform 102 and a second platform 104. Each platform 102 and 104 is substantially elongated and extends from the second cavity wall 32 toward and in a direction perpendicular to the side walls 84 and 86. More specifically, each of the platforms 102 and 104 is coupled to and cantilevers from the second cavity wall 92.

The first platform 102 is positioned relatively near the first end 94, and the second platform 104 is positioned relatively near the second end 96 of the cavity 88. However, neither platform 102 or 104 fully extends to the respective cavity end 94 or 96. Therefore, a first gap or recess 106 and a second gap or recess 108 is defined between the first platform 102 and the first end 94 and between the second platform 104 and the second end 96, respectively. In addition, the second platform 104 is longitudinally spaced from the first platform 102 to define a third gap or recess 110 between the two platforms 102 and 104. In one embodiment, each platform 102 and 104 includes a hooked or curved end or extension feature 111 or 113, respectively, adjacent the third recess 110 that curves away from the first cavity wall 90.

Each platform 102 and 104 defines a lower surface 112 and 114, respectively, wherein the lower surfaces 112 and 114 are located in the same plane, and each lower surfaces 112 and 114 extends substantially parallel with the hard drive surfaces 80 and 82. A plurality of connection points or connection pads 116 are coupled to each lower surface 112 and 114. Each connection pad 116 is substantially elongated and extends from the within the hard drive 32, through the second cavity wall 92, and along one of the platform lower surfaces 112 or 114 toward the first side wall 84.

Each connection pad 116 is plated with a conductive material, such as gold, beryllium copper, or tool steel. In a preferred embodiment, each connection pad 116 is plated with gold. In one embodiment, each connection pad 116 relates to one of power or ground. In one embodiment, the electronic data connector 100 includes a total of twenty-two connection points or pads 116. In one embodiment, seven connection pads 116 are coupled with the first platform 102, and fifteen connection pads 116 are coupled with the second platform 104. In one embodiment, the connection pads 116 are evenly spaced along the platforms 102 and 104.

Upon assembly of the data storage cartridge 12, the hard drive 32 is placed at least partially within the first housing section 34 such that the electronic data connector 100 of the hard drive 32 is aligned with the access window 54 of the first housing section 34. As such, the connection pads 116 of the electronic data connector 100 are each transversely accessible from a point external to the data storage cartridge 12 via the access window 54. In one embodiment, the hard drive 32 is attached to the first housing section 34 with screws (not illustrated). Other or additional methods of attachment between the first housing section 34 and the hard drive 32 will be apparent to those of ordinary skill in the art.

Once the hard drive 32 is secured to the first housing section 34, the second housing section 36 is placed over the hard drive 32 and coupled with the first housing section 34. In particular, the housing sections 34 and 36 interact such that the leading wall 64, the trailing wall 66, the first side wall 68, and the second side wall 70 of the second housing section 36 interact with the leading wall 42, the trailing wall 44, the first side wall 46, and the second side wall 48 of the first housing section 34, respectively. In one embodiment, the second housing section 36 is additionally coupled with the hard drive 32.

Figure 4:
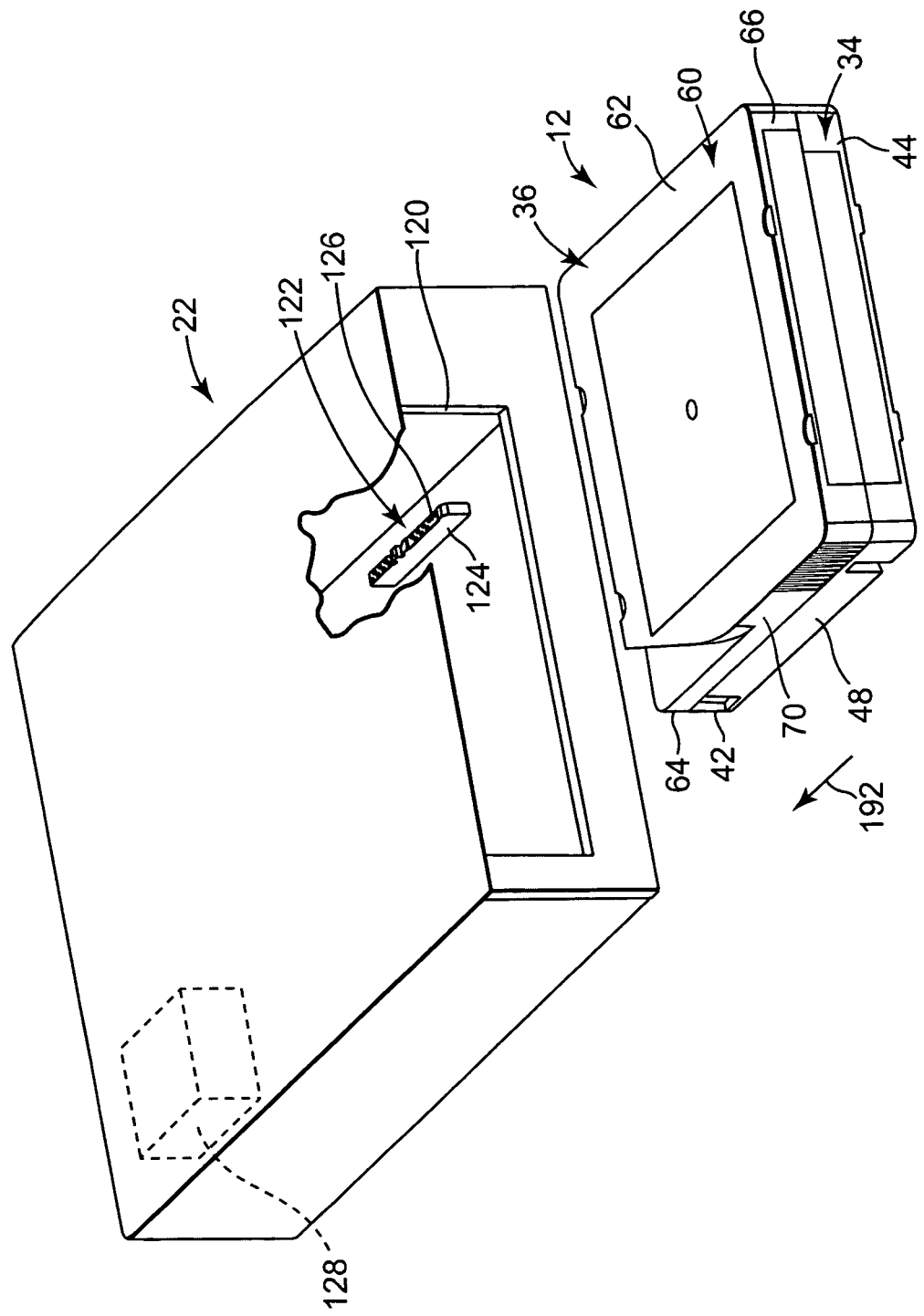
FIG. 4 is a perspective view of the data storage tape cartridge of FIG. 2 and an associated cartridge drive of FIG. 1.

Similar to the general interaction between the conventional data storage tape cartridges and tape drives, the data storage cartridge 12 is adapted to interact with the cartridge drive 22 as illustrated in FIG. 4. The cartridge drive 22 is adapted to access the hard drive 32 (FIGS. 2 and 3) within the housing 30 in order to read data from and/or write data to and from the hard drive 32. In one embodiment, in which the cartridge drive 22 is a tape drive emulator, the cartridge drive 22 is further adapted to convert the data received from the hard drive 32 into a format emulating or imitating the typical data format retrieved from conventional, data storage tape cartridges as fully described in U.S. patent application Ser. No. 10/294,514 filed Nov. 14, 2002 entitled "Method and System for Emulating Tape Storage Format Using a Non-Tape Storage Medium," which is hereby incorporated herein by reference. In this manner, the cartridge drive 22, or more precisely, the tape drive emulator, appears to other computing devices as a conventional data storage tape cartridge. Therefore, the drivers or software executing on the other computing devices need not be altered to interact with the cartridge drive 22 rather than with a conventional tape drive with which the drivers and software were originally designed to interact. As such, replacement of a conventional tape drive with the cartridge drive 22 allows an existing system or library to utilize data storage cartridges 12 including a hard drive 32 rather than the conventional, data storage tape cartridges.

Referencing FIG. 4, one embodiment of the cartridge drive 22 includes a cavity or socket 120 adapted to selectively receive the data storage cartridge 12. A drive connector 122 is located within the cartridge drive 22 and configured to access the electronic data connector 100 (FIG. 3) of the hard drive 32 via the access window 54 (FIG. 2) of the cartridge housing 30. In one embodiment, an actuation mechanism or pin (not shown) is also located in the socket to open the door 56 (FIG. 2) upon insertion to allow the drive connector 122 to access the hard drive 32.

Figure 5:
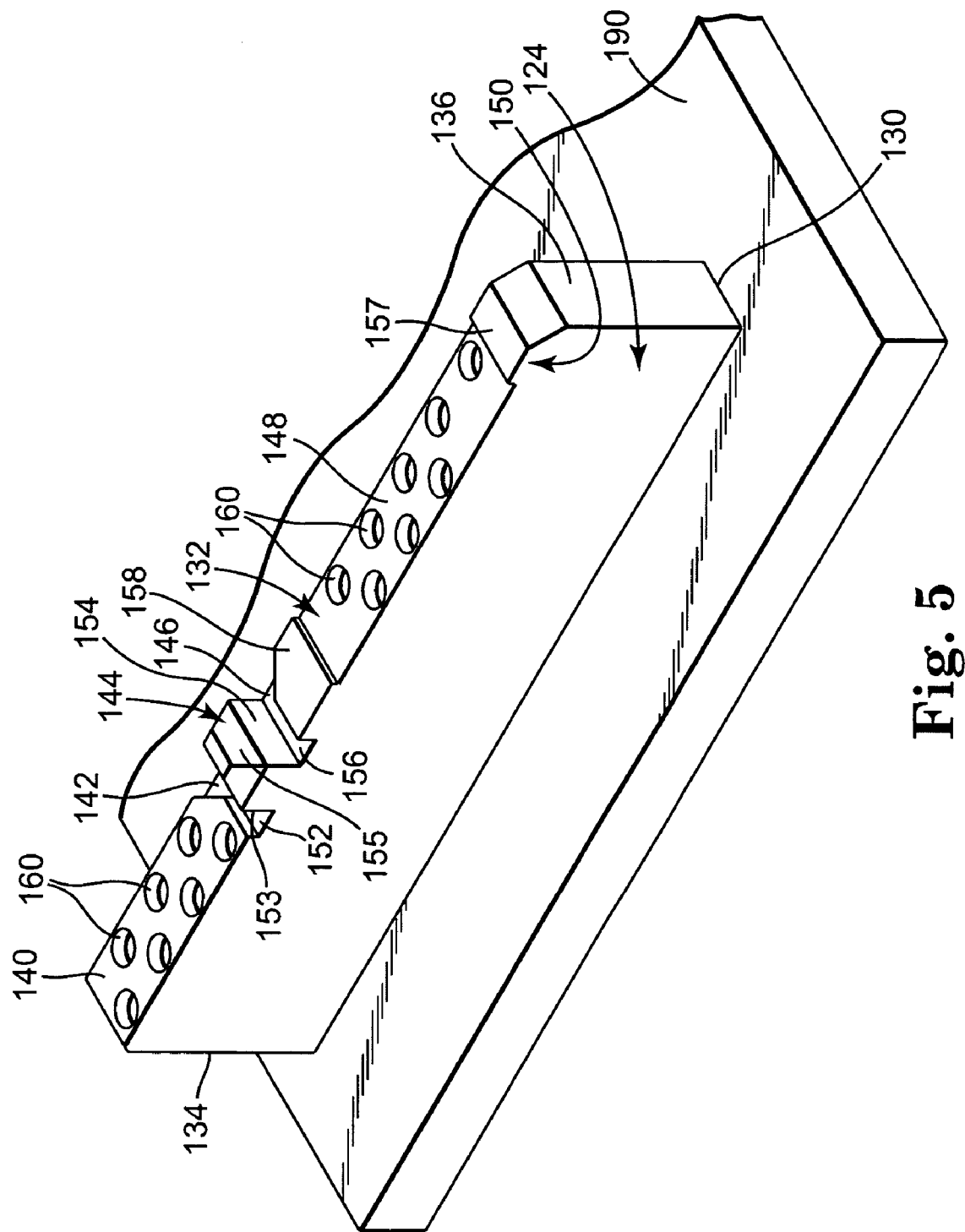
FIG. 5 is a perspective view of one embodiment of a mounting block of the cartridge drive of FIG. 4.

In one embodiment, the drive connector 122 includes a mounting block 124 and a plurality of compliant pins 126. As illustrated in FIG. 5, the mounting block 124 is a substantially elongated, more preferably, substantially rectangular, block defining a substantially planar bottom surface 130, a top surface 132 opposite the bottom surface 130, a first end 134, and a second end 136 opposite the first end 134. The first and second ends 134 and 136 each extend between the bottom surface 130 and the top surface 132.

In one embodiment, the top surface 132 includes a first planar portion 140, a first cutout 142, a stop or protrusion 144, a second cutout 146, a second planar portion 148, and an interface pad 150. The first planar portion 140 extends from the first end 134 towards the second end 136. The first planar portion 140 extends substantially parallel to the bottom surface 130. The first cutout 142 is adjacent the first planar portion 140 and defines a cutout surface 152 relatively closer to the bottom surface 130 than the first planar portion 140. The protrusion 144 is adjacent the first cutout 142 opposite the first planar portion 140 and extends further from the bottom surface 130 than the first planar portion 140. More specifically, the protrusion 144 defines a first vertical interface surface 153 adjacent the first cutout 142 and a second vertical interface surface 154 adjacent the second cutout 144 opposite the first vertical interface surface 153. In one embodiment, the protrusion is at least partially tapered opposite cutouts 142 and 144 to define at least one tapered surface 155.

The second cutout 146 is adjacent the protrusion 144 opposite the first cutout 142. The second cutout 146 is similar to, more precisely, mirrors, the first cutout 142 and, as such, defines a cutout surface 156 relatively closer to the bottom surface 130 than the first planar portion 140. The second planar portion 148 extends from the second cutout 146 opposite the protrusion 144 towards the second end 136. The second planar portion 148 is positioned substantially parallel to and spaced a distance from the bottom surface 130 in a similar manner as the first planar portion 140. In one embodiment, the second planar portion 148 includes a step surface or pad 158 near the second cutout 146 that is spaced further from the bottom surface 130 than the remainder of second planar portion 148. The interface pad 150 generally extends from the second planar portion 148 opposite the second cutout 146 toward the second end 136. In one embodiment, the interface pad 150 defines a pad surface 157 spaced from the bottom surface 130 a distance further than the second planar portion 148 but a distance less than the protrusion 144. In one embodiment, the interface pad tapers down from the pad surface 157 to interface with the second end 136.

A plurality of cavities 160 are formed in the mounting block 124 extending from and through the bottom surface 130 to and through the top surface 132. Each cavity is substantially cylindrical and extends in a direction substantially perpendicular to the bottom surface 130. More particularly, each of the cavities 160 extends through one of the first planar portion 140 or the second planar portion 148 of the top surface 132. In one embodiment, each cavity 160 is spaced in the longitudinal direction to align with one of the connection pads 116 of the electronic data connector 100 of the hard drive 32, as will be further described below. In one embodiment, the cavities 160 are laterally staggered to facilitate the proper longitudinal spacing of the cavities 160. In one embodiment, seven cavities 160 are defined through the first planar portion 140, and eight cavities 160 are defined through the second planar portion 148. Each cavity 160 is configured to at least partially receive one of the compliant pins 126 (FIG. 6).

In one embodiment, the mounting block 124 is formed of any non-conductive material. In one embodiment, the mounting block 124 is formed by injection molding a suitable material, such as polycarbonate, plastic, etc. Alternatively, other materials and/or manufacturing techniques can be employed to form the mounting block 124.

Figure 6:
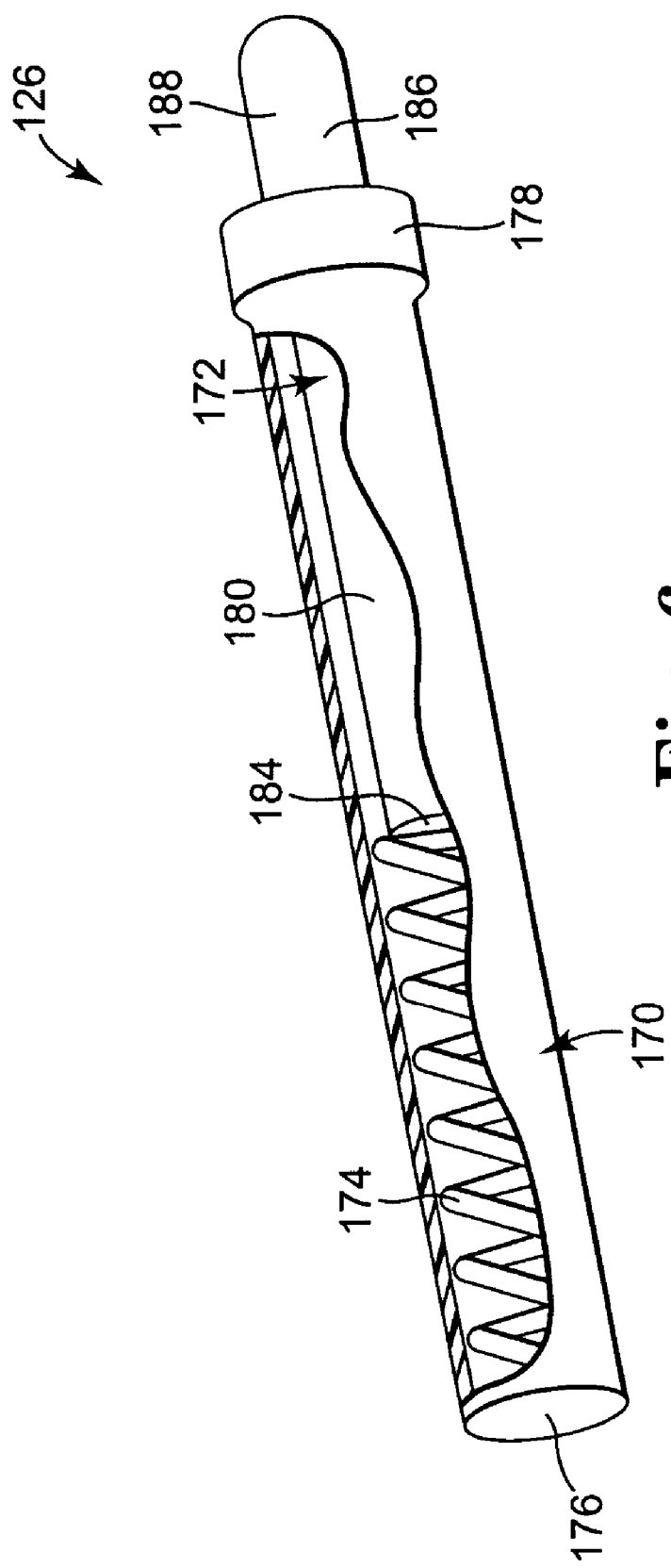
FIG. 6 is a perspective view of one embodiment of a compliant pin of the cartridge drive of FIG. 4.

An embodiment of one of the compliant pins 126 is illustrated in FIG. 6. Each compliant pin 126 includes a barrel 170, a plunger 172, and a spring 174. The barrel 170 is a substantially hollow cylinder defining a first, capped end 176 and a second, open end 178. The plunger 172 includes a shaft 180, which is substantially cylindrical and defines a first end 184 and a second end 186. The second end 186 defines a contact tip 188. In one embodiment, the contact tip 188 is rounded, although other contact tip styles, such as crowned or pointed tip styles, may also be used. However, the rounded tip 188 prevents excess wear or scraping of the connection pads 116 as will become more apparent below. In one embodiment, the barrel 170 and plunger 172 are each plated with a conductive metal, such as gold, beryllium copper, or tool steel. In a preferred embodiment, the barrel 170 and the plunger 172 are each gold plated. In one embodiment, the compliant pin 126 is a POGO® pin, such as a POGO® pin typically used in end-of-the-line manufacturing circuit board testing and available from Everett Charles Technologies of Pomona, Calif.

In one embodiment, the spring 174 is a coil or tension spring housed within the barrel 170. More specifically, the spring 174 is placed within the barrel 170 to interact with the capped end 176 of the barrel 170. The shaft of the plunger is placed at least partially within the barrel 170 through the open end 178. As such, the first end 184 of the shaft 180 interacts with the spring 174 opposite the capped end 176 of the barrel 170.

With the above in mind, the plunger 172 can selectively move longitudinally with respect to (i.e., substantially in and out of) the barrel 170. The total amount of movement of the plunger 172 allowed with respect to the barrel 170 is referred to as the plunger travel. In one embodiment, the plunger travel is between 0.03 inch (0.76 mm) and 0.065 inch (1.65 mm), more preferably, 0.045 inch (1.14 mm). In an alternative embodiment, (not illustrated) the first end 176 is also open and the compliant pin 126 additionally includes a second plunger extending out the first end of the barrel 170 with the spring 174 extending between the two plungers.

Figure 7:
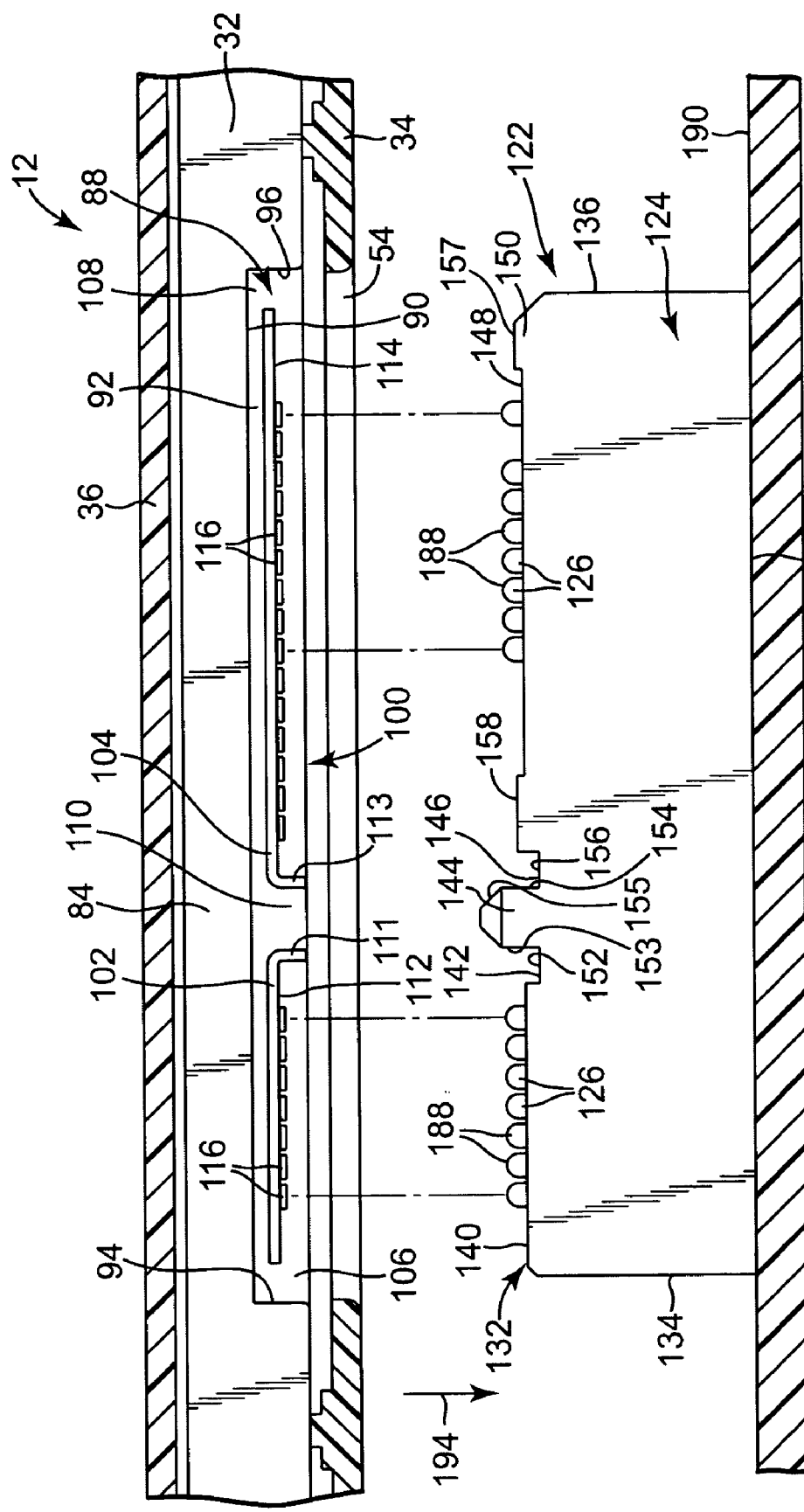
FIG. 7 is a cross-sectional view of the interaction between the compliant pins of the cartridge drive of FIG. 1 and the non-tape storage medium of the data storage cartridge of FIG. 2.

Collectively referring to FIGS. 5, 6, and 7, the bottom surface 130 of the mounting block 124 is mechanically coupled to an internal surface 190 including a drive circuit (not shown) of the cartridge drive 22. Each compliant pin 126 is placed within one of the cavities 160 of the mounting block 124. More particularly, the compliant pin 126 is placed through the top surface 132 and into the respective cavity 160 with the capped end 176 entering the cavity 160 first. As such, the capped end 176 of the compliant pin 126 contacts and electrically interacts with the internal surface 190 of the cartridge drive 22. In one embodiment, the capped end 176 of the compliant pin 126 is soldered to the internal surface 190, more particularly, to the internal circuitry (not shown) of the cartridge drive 22 that is placed on the internal surface 190. The contact tip 188 extends outside of the cavity 160 (i.e., above the top surface 132 of the respective planar section 140 or 148).

Figure 8:
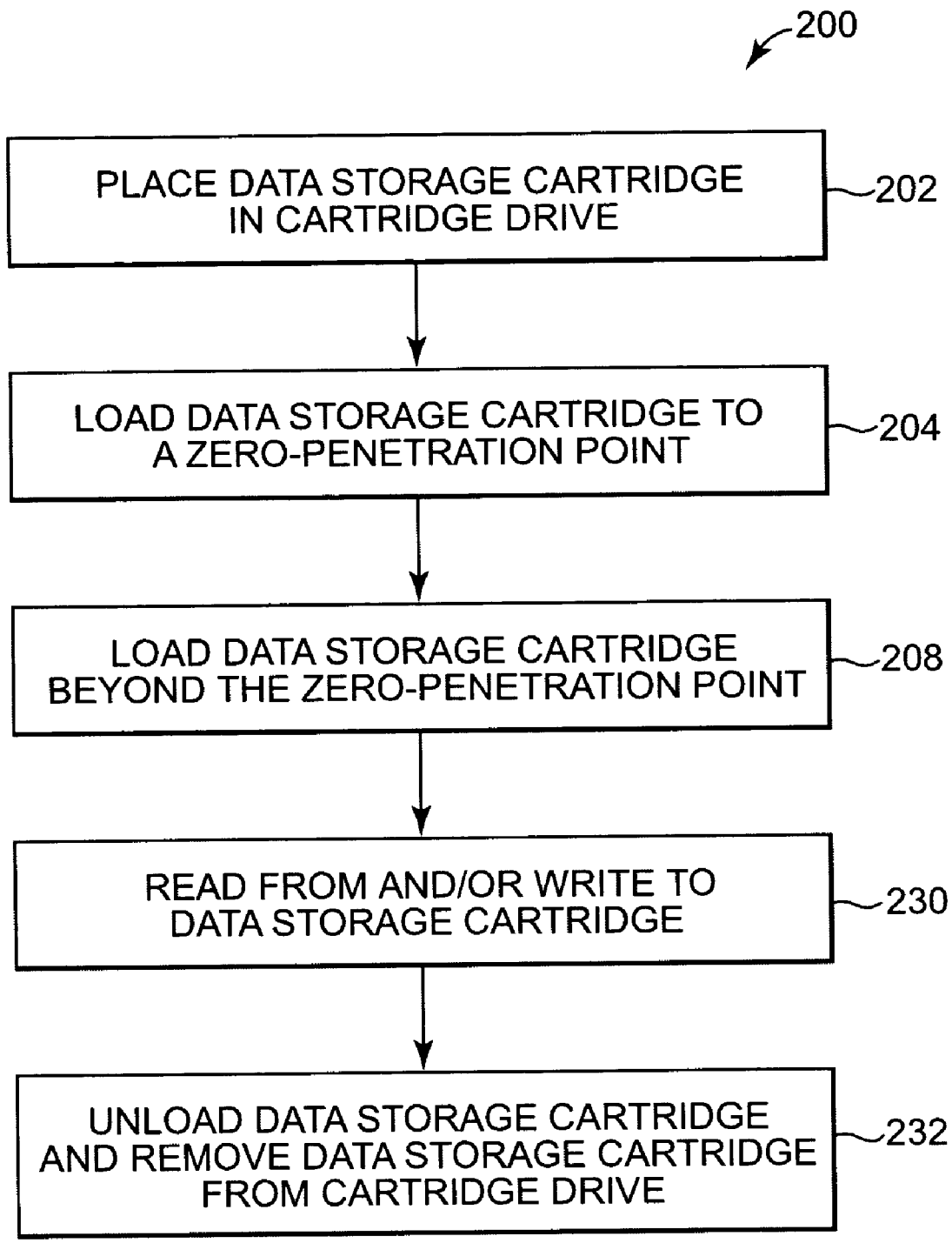
FIG. 8 is a flow chart illustrating one embodiment of a method of electrically connecting the cartridge drive of FIG. 4 and the data storage cartridge of FIG. 2.

A process of reading data from and/or writing data to the hard drive 32, more particularly, to the non-tape storage medium 72 of the hard drive 32, of the data storage cartridge 12 is generally illustrated at 200 in FIG. 8 with additional reference to FIGS. 4 and 7. At 202, the data storage cartridge 12 is positioned with the leading walls 42 and 64 facing the socket 120 of the cartridge drive 22, and the data storage cartridge 12 is slid into the socket 120 as indicated by the arrow 192, which, in the embodiment illustrated, points in a horizontal direction. As the data storage cartridge 12 is slid into the socket 120, the door 56 (FIG. 2) is gradually opened. When in the open position, the door 56 leaves the access window 54 (FIG. 2) uncovered and substantially unobstructed. When fully placed within the socket 120, the drive connector 122 and the electronic data connector 100 of the hard drive 32 are grossly aligned with one another for subsequent interaction, as will be described below.

Following alignment, at 204, the data storage cartridge 12 is loaded to a zero-penetration point. More particularly, a motor 128 (generally indicated in FIG. 4) loads or drives the data storage cartridge 12 to move the data storage cartridge 12 including the connection pads 116 of the hard drive 32 toward the drive connector 122 as indicated by the arrow 194, which in the embodiment illustrated is in the vertical direction. In one embodiment, as the data storage cartridge 12 moves toward the drive connector 122, features of the mounting block 124 and the electronic data connector 100 interact to more precisely align the drive connector 122 with the electronic data connector 100 of the data storage cartridge 12, more particularly, to more precisely position each of the contact tips 188 of the compliant pins 126 in line with a corresponding connection pad 116 of the hard drive 32. In particular, the at least one tapered surface 155 of the protrusion 144 acts as a lead-in surface to position the protrusion 144 within the first recess 110 of the electronic data connector 100 (i.e., to fit between the first and second platforms 102 and 104). As the data storage cartridge 12 is loaded, the cutouts 142 and 146 selectively receive the hooked ends 111 and 113 of the platforms 102 and 104, respectively. More specifically, the protrusion 144 is sized such that the interface surfaces 153 and 154 interact or nearly interact with the hook ends 111 and 113 flanking the recess 110 to more precisely position the compliant pins 126 of the drive connector 122 to align with the connection pads 116 of the electronic data connector 100 for subsequent interaction.

In one embodiment, as the data storage cartridge 12 is loaded, the interface pad 150, more particularly, the pad surface 157, also interacts with the electronic data connector 100 to facilitate adjustment of the position of the plurality of connection pads 116 in the horizontal plane to more precisely align with the plurality of compliant pins 126. In one embodiment, the pad surface 157 interacts with the lower surface 114 of the second platform 104 of the electronic data connector 100, to effectively work with the protrusion 144 to further adjust the position or tilt of the electronic data connector 100 in the horizontal plane to prevent overall misalignment of the drive connector 122 with respect to the electronic data connector 100. In one embodiment, interaction between the pad surface 157 and the second platform 104 also decreases or prevents overdriving of the compliant pins 126, as will become more apparent below.

The compliant pins 126 transversely contact the connection pads 116. Otherwise stated, each of the contact tips 188 of the compliant pins 126 approach and contact the respective one of the connection pads 116 in a manner substantially perpendicular to the overall extension of the respective connection pad 116 from the second cavity wall 92. As such, in one embodiment, the compliant pins 126 generally do not contact the connection pads 116 by sliding over a surface of the connection pads 116. Contact between the compliant pins 126 and the connection pads 116 compresses the compliant pins 126 (i.e., moves the plunger 172 further into the barrel 170) as the data storage cartridge 12 is continually driven vertically toward the drive connector 122.

The data storage cartridge 12 is continually loaded, thereby moving the connection pads 116 towards the compliant pins 126, until the zero-penetration point is reached. The zero-penetration point is reached when at least two compliant pins 126 are in substantial electrical contact with at least two of the respective connection pads 116 of the cartridge hard drive 32 such that the at least two connection pads 116 have electrical continuity with each other. Continuous electrical contact is established at some penetration point beyond the zero-penetration point when electrical contact is established between all the compliant pins 126 and the respective connection pads 116. In one embodiment, the amount of additional penetration needed to transition from the zero-penetration point to the point of continuous electrical contact is defined by the combined variations in the compliant pin height and the connection pad location. When continuous electrical contact is established, the cartridge drive 22 can electronically access the information stored on the non-tape storage medium 72 of the hard drive 32 via the drive connector 122 and the electronic data connector 100.

Figure 9:
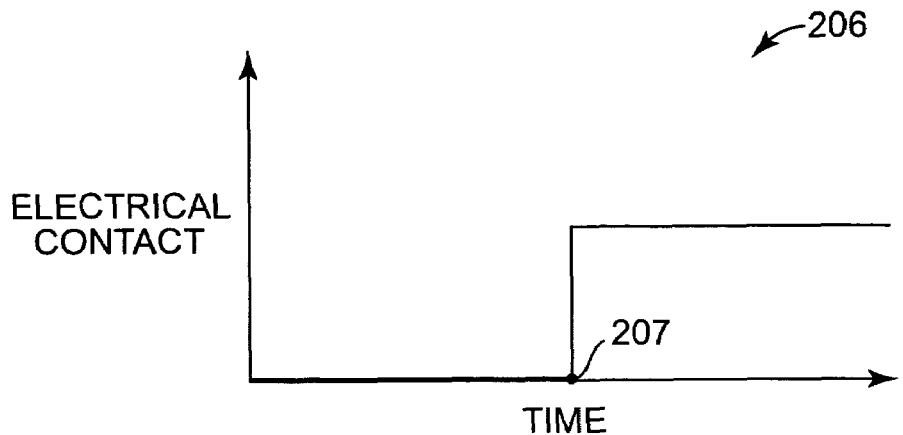
FIG. 9 is a graphical representation of electrical contact versus time as tracked during one embodiment of the method of FIG. 8.

The zero-penetration point is more specifically illustrated with additional reference to a graph 206 of FIG. 9 where electrical contact between the compliant pins 126 and the connection pads 116 is tracked on the Y-axis versus time on the X-axis. Electrical contact between the compliant pins 126 and the connection pads 116 is determined based on electrical feedback from the circuit of the internal surface 190, which as previously described is in constant electrical contact with the compliant pins 126. At point 207 of the graph 206, at least two of the compliant pins 126 contact the corresponding at least two connection pads 116 and continuous electrical contact is established. Accordingly, the point 207 is equal to the zero-penetration point.

Figure 10:
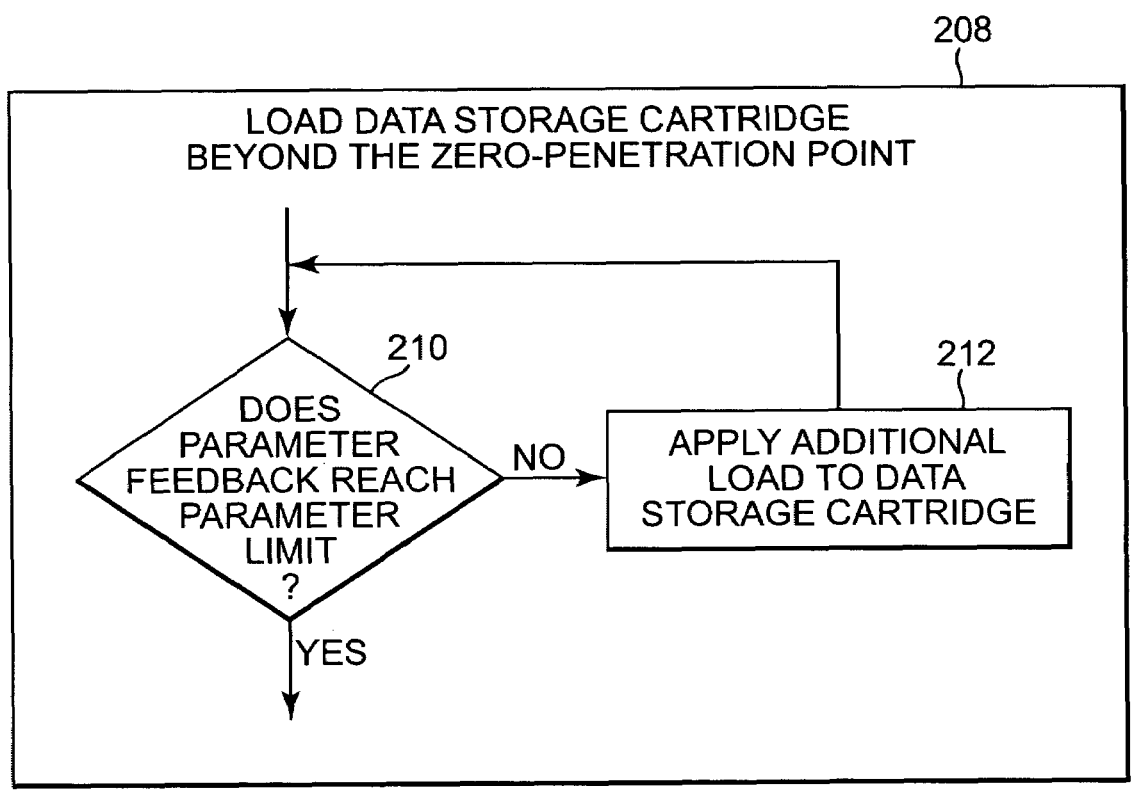
FIG. 10 is a flow chart illustrating one embodiment of the step of loading the data storage cartridge beyond the zero-penetration point of the method of FIG. 8.

Referring once again to FIG. 8 in view of FIG. 7, at 208, the data storage cartridge 12 is loaded beyond the zero-penetration point to establish a more robust electrical connection between the electronic data connector 100 and the drive connector 122. Additionally referring to FIG. 10, loading the data storage cartridge 12 beyond the zero-penetration point 207 generally follows the process of analyzing a parameter feedback to determine if the parameter feedback is equal to or reaches a preset or identifiable parameter limit at 210 and applying additional load to the data storage cartridge 12 at 212, if needed. In one embodiment, the parameter limit is determined based at least in part upon balancing the need for sufficient loading to establish good electrical contact between the hard drive 32 and the cartridge drive 22 and the concern that too much loading will cause excessive or unwanted wear of the hard drive connection pads 116.

For example, in one embodiment, once the zero-penetration point is reached, the data storage cartridge 12 is further loaded to compress the compliant pins 126 (i.e., to move the plunger 172 further within the barrel 170) a pre-determined distance equal to about 25% to about 75% of the total plunger travel of the compliant pin 126. More preferably, the compliant pins 126 are additionally compressed an additional distance equal to about 50% of the total available plunger travel. For example, where the total plunger travel of the compliant pins 126 is equal to about 0.45 inch (1.14 mm), after the zero-penetration point is reached, the cartridge drive 22 is configured to load or move the data storage cartridge 12 an additional 0.225 inch (0.57 mm) to further compress the compliant pins 126.

Accordingly, at 210 the parameter analyzed is the additional distance the data storage cartridge 12 has been driven since the zero-penetration point was reached, which is substantially equal to the additional compression of the compliant pins 126. If the additional distance is determined at 210 not to be equal to the pre-determined distance, such as 0.225 inch (0.57 mm), at 212, additional load is applied to the data storage cartridge 12 to further compress the compliant pins. Alternatively, if the additional distance is determined at 210 to be equal to the pre-determined distance, such as 0.225 inch (0.57 mm), no additional loading of the data storage cartridge is necessary, the motor 128 is stopped, and the process 200 continues to step 230.

Figure 11:
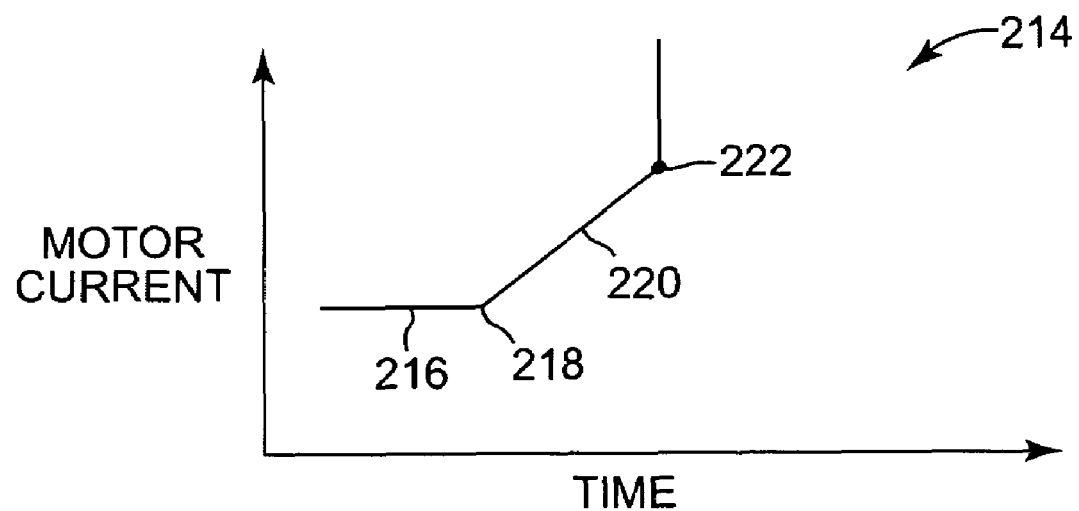
FIG. 11 is a graphical representation of motor current versus time as tracked during one embodiment of the method of FIG. 8.

In another embodiment, the parameter analyzed at 210 is the motor current of the motor 128 driving movement of the data storage cartridge 12 toward the drive connector 122. As illustrated with additional reference to a load graph 214 illustrated in FIG. 11, the motor current of the motor 128 is tracked in time starting when loading of the data storage cartridge 12 begins. During initial movement of the data storage cartridge 12, the hard drive connection pads 116 within the cartridge 12 are not contacting the compliant pins 126 and, therefore, since there is no resistance to the movement of the data storage cartridge 12, the motor current remains constant as shown in portion 216 of the graph 214.

At point 218 of the graph 214, the connection pads 116 contact the compliant pins 126. As the data storage cartridge 12 is continually loaded, the resistance or spring force of the connection pads 116 against the compliant pins 126 causes the motor current to gradually increase as illustrated in graph portion 220. In one embodiment, the parameter limit is set to a certain level of motor current within the graph portion 220, such as in the middle of the graph portion 220, etc.

In a similar embodiment, the parameter limit is the hard stop indicated at point 222 on the graph 214. The hard stop 222 is reached when the resistance of the drive connector 122 on the data storage cartridge 12 overcomes the power of the motor 128, stopping any additional movement of the data storage cartridge 12 toward the drive connector 122. In one embodiment, the hard stop 222 is reached when one or both of the hooked ends 111 and 113 of the electronic data connector 100 contacts the respective cutout surface(s) 152 and/or 154. With this in mind, in one embodiment, the cutouts 142 and 146 have a depth sufficiently small to prevent or at least decrease overdriving of the data storage cartridge 12 with respect to the drive connector 122, which could bend or otherwise damage the connection pads 116 and/or damage the compliant pins 126.

Accordingly, once again referring to FIG. 10, at 210 it is determined whether either the predetermined motor current limit or the hard stop 222 has been reached. If the predetermined motor current limit or the hard stop 222 has not been reached, at 212, additional load is applied to the data storage cartridge and the determination at 210 is performed again. If the predetermined motor current limit or the hard stop 222 has been reached, no additional loading of the data storage cartridge is necessary, the motor 128 is stopped, and the process 200 continues to step 230. Notably, in one embodiment, in which the parameter limit is the motor current limit or hard stop, loading the data storage cartridge 12 to the parameter limit automatically loads the data storage cartridge 12 beyond the zero-penetration point, which alleviates or lessens the need to actually ascertain the zero-penetration point and effectively merges steps 204 and 208.

Figure 12:
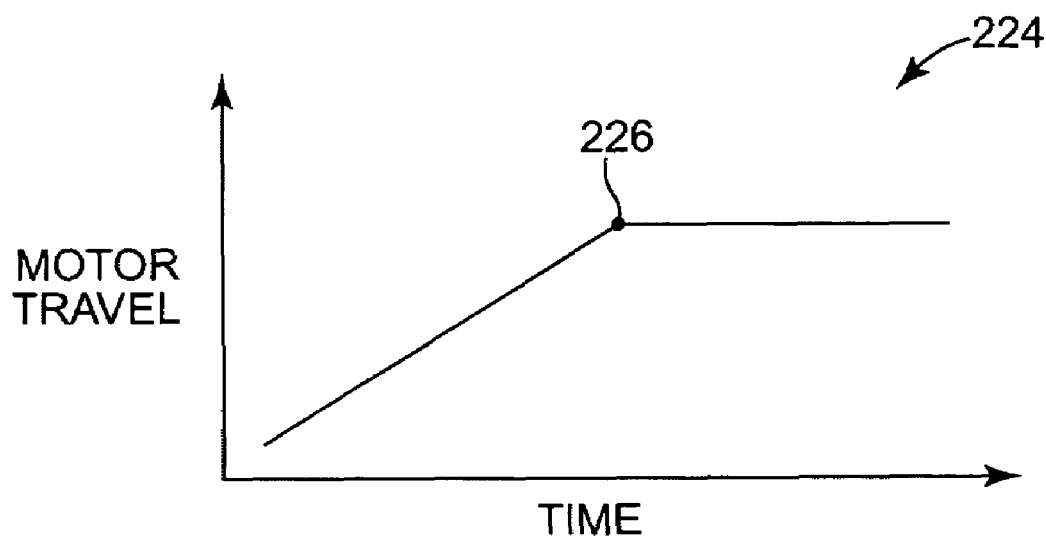
FIG. 12 is a graphical representation of motor travel versus time as tracked during one embodiment of the method of FIG. 8.

In yet another embodiment, the parameter analyzed at 208 is the motor travel while driving the data storage cartridge 12 toward the drive connector 122. As illustrated in a load graph 224 in FIG. 12, the motor travel is tracked along the Y-axis versus time tracked on the X-axis starting when the loading of the data storage cartridge 12 begins. As the motor 128 operates to move the data storage cartridge 12 toward the drive connector 122, at least a portion of the motor travels accordingly. The motor 128 continues to travel upon making contact between the compliant pins 126 and the hard drive connection pads 116 until the hard stop, which once again is caused by the hooked ends 111 and 113 contacting the cutout surfaces 152 and 156 of the mounting block 124, is reached at point 226. At the hard stop 226, the interaction between the hooked ends 111 and 113 and the cutout surfaces 152 and 156 causes resistance that generally prevents additional movement of the data storage cartridge 12, thereby generally preventing additional motor travel.

Accordingly, once again referring to FIG. 10, at 210 it is determined whether either the predetermined the hard stop 226 has been reached. If the hard stop 226 has not been reached, at 212, additional load is applied to the data storage cartridge 12 and step 210 is performed again. If the hard stop 226 has been reached, no additional loading of the data storage cartridge 12 is necessary, the motor 128 is stopped, and the process 200 continues to step 230. In another embodiment, a predetermined motor travel prior to the hard stop 226 may be the parameter limit. Notably, in one embodiment, in which the parameter limit is the hard stop, loading the data storage cartridge 12 to the parameter limit automatically loads the data storage cartridge 12 beyond the zero-penetration point, which alleviates or lessens the need to actually ascertain the zero-penetration point and effectively merges steps 204 and 208.

At 230, the cartridge drive 22 reads data from and/or writes data to the hard drive 32, more particularly, the non-tape storage medium 72, via the drive connector 122 and the electronic data connector 100. Once the desired data has been read from and/or written to the hard drive 32, at 232, the data storage cartridge 12 is unloaded which moves the data storage cartridge 12 in a direction opposite that of the arrow 194 (FIG. 7), and the data storage cartridge 12 is slid out of and removed from the cartridge drive 22. In one embodiment, upon removal from the cartridge drive 22, the data storage cartridge 12 is returned to the appropriate storage location within the cartridge storage unit 14 (FIG. 1).

Figure 13:
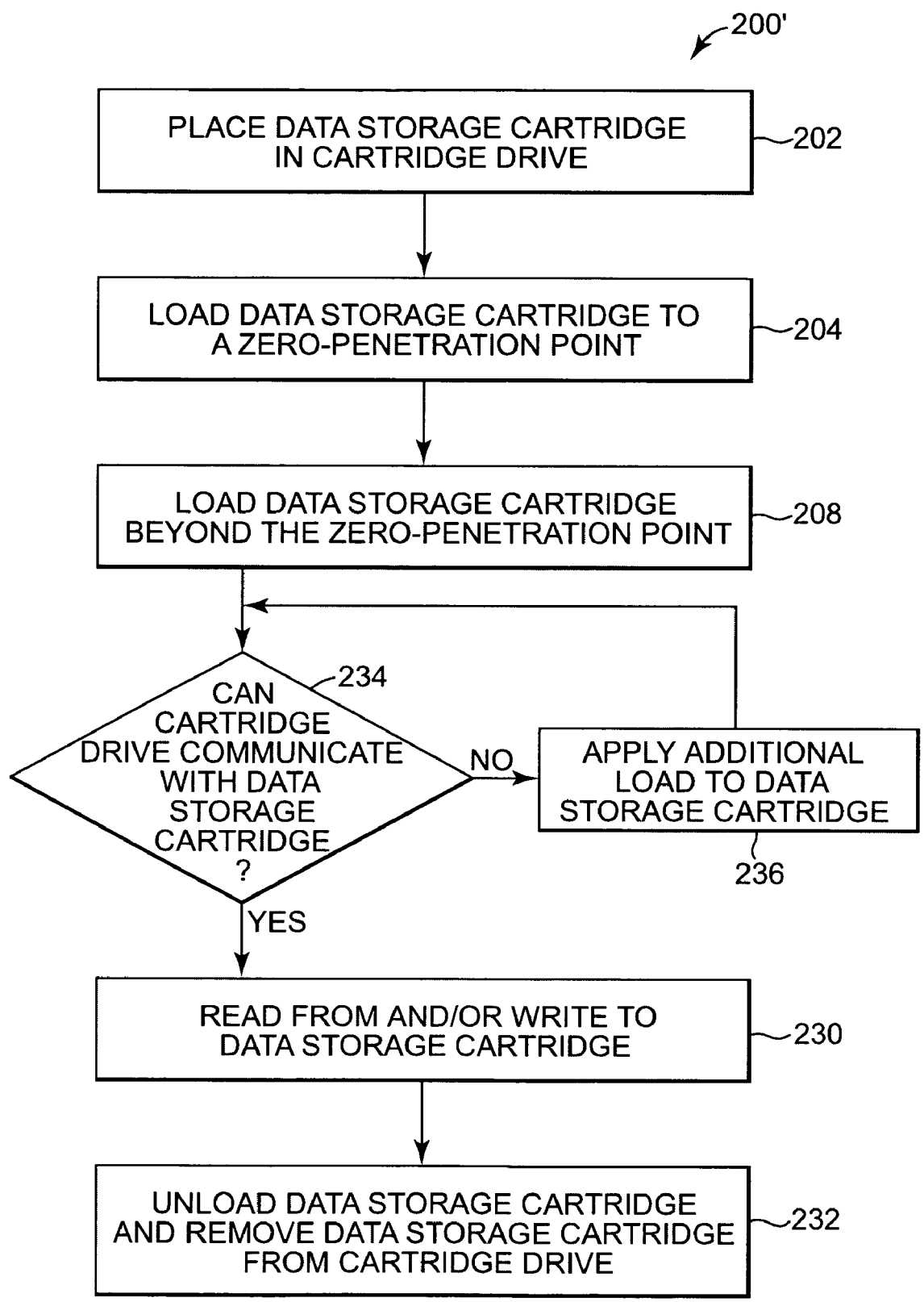
FIG. 13 is a flow chart illustrating one embodiment of a method of electrically connecting the cartridge drive of FIG. 1 and the data storage cartridge of FIG. 2.

Another embodiment of a process of reading data from and/or writing data to the hard drive 32, more particularly, the non-tape storage medium 72 of the data storage cartridge 12 is generally illustrated at 200' in FIG. 13. The process of reading data from and/or writing data to the hard drive 32 of the data storage cartridge 12 at 200' is similar to the process of reading data from and/or writing data to the hard drive 32 of the data storage cartridge 12 at 200, described above, except for those steps specifically enumerated herein. In one embodiment, following loading the data storage cartridge 12 beyond the zero-penetration point at 208, the cartridge drive 22 attempts to communicate with the hard drive 32 within the data storage cartridge 12. At 234, upon attempting to communicate, the cartridge drive 22 determines if it can communicate with the hard drive 32. If the cartridge drive 22 can communicate with the hard drive 32, then, at 230, the hard drive 32 of the data storage cartridge 12 is read from and/or written to at 230 as described above.

If at 234 it is determined that the cartridge drive 22 cannot electronically communicate with the data storage cartridge 12, more particularly, with the hard drive 32 within the data storage cartridge 12, then an additional load is applied to the data storage cartridge 12 to further move the connection pads 116 toward the compliant pins 126 in attempt to remedy the electronic communication defect. Following application of the additional load at 236, the process returns to step 234 to determine if the cartridge drive 22 can electronically communicate with the data storage cartridge 12 and the process in repeated until the cartridge drive 22 can electronically communicate with the data storage cartridge 12 or until some other outside parameter limit (such as a hard stop 222 or 226) is reached.

An electrical connection between the electronic data connector of the data storage cartridge hard drive and the drive connector according to the present invention provides for a non-sliding electrical connection between the connection pads of the data storage cartridge with respect to the drive connector. The non-sliding or intersection method of connection between the compliant pins of the drive connector and the connection pads of the electronic data connector prevent excessive scraping of the connection pads that occurs in sliding connections. By preventing excessive scraping of the connection pads, the gold plating of the connection pads is preserved throughout a plurality of connection cycles, thereby, increasing the integrity of the connection of the cartridge drive with the particular data storage cartridge for a prolonged period of time. Accordingly, the life span of each data storage cartridge is increased.

Moreover, the electrical connection between the electronic data connector of the data storage cartridge hard drive and the drive connector using compliant pins also provides for adaptive loading of the connection pads towards the drive connector. Adaptive loading of the connection pads and the protrusion features of the drive connector each prevent unnecessary overdriving of the data storage cartridge while still allowing adjustments to be made to establish a valid electrical connection between the hard drive and the cartridge drive. By preventing or decreasing overdrive of the data storage cartridge with respect to the drive connector, other data storage cartridge damage, such as bent or deformed connection pads, etc., is also prevented, which further contributes to a longer life span of each data storage cartridge.

Although specific embodiments have been illustrated and described herein, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate the present invention may be implemented in a very wide variety of embodiments. For example, although described with respect to an automation library system, the electrical connector and associated method can also be incorporated between a data storage cartridge and a single, freestanding cartridge drive, the orientation of the cartridge drive may be adjusted such that the data storage cartridge is slid into the cartridge drive in a vertical direction and loaded in a horizontal direction, etc. This application is intended to cover any adaptations or variations of the embodiments discussed herein. Therefore, it is manifestly intended that this invention be limited only by the claims and the equivalence thereof.

What is claimed is:

1. A data storage cartridge comprising:
    a non-tape storage medium;
    a data connector including:
        a platform disposed within a cavity defined by a major cavity wall and an opening opposite the major cavity wall, the platform defining opposing, first and second major surfaces,
        a plurality of connection pads configured to provide electrical access to the non-tape storage medium, the connection pads attached to the first major surface,
        wherein the second major surface faces, and is transversely spaced from, the major cavity wall; and
    a cartridge housing substantially enclosing the non-tape storage medium and the data connector;
    wherein the platform is cantilevered relative to the cartridge housing such that the second major surface is deflectable toward the major cavity wall, and further wherein the connection pads are transversely accessible by a read/write device, the read/write device being configured to receive the data storage cartridge and to at least one of read data from and write data to the non-tape storage medium via the plurality of connection pads.

2. The data storage cartridge of claim 1, further comprising a hard drive including the non-tape storage medium and the data connector.

3. The data storage cartridge of claim 2, wherein the hard drive forms the major cavity wall.

4. The data storage cartridge of claim 3, wherein the housing encompasses an entirety of the hard drive and forms a window aligned with the opening.

5. The data storage cartridge of claim 1, wherein the non-tape data storage medium includes a solid-state storage medium.

6. The data storage cartridge of claim 1, further comprising a recess between a first portion of the plurality of connection pads and a second portion of the plurality of connection pads, the recess being configured to interact with a protrusion of the read/write device to facilitate alignment of the data connector with the read/write device.

7. The data storage cartridge of claim 1, further comprising an extension feature configured to interact with the read/write device to prevent overloading of the connection pads.

8. The data storage cartridge of claim 1, wherein the major cavity wall terminates at a side wall opposite a base wall from which the platform extends, and further wherein the platform terminates opposite the base wall at a leading edge spaced from a plane of the side wall in a direction of the base wall.

9. The data storage cartridge of claim 1, wherein the opening has a continuously open length, and further wherein the plurality of connection pads are arranged side-by-side and include opposing, end-most connection pads defining a collective width of the plurality of connection pads, the collective width being less than the continuously open length.

10. The data storage cartridge of claim 1, wherein the platform includes a first platform section maintaining a first one of the connection pads and a second platform section maintaining a second one of the connection pads, and further wherein the platform sections are discontinuous relative to one another.

11. The data storage cartridge of claim 10, wherein the first platform section terminates at an end that is adjacent to, and spaced from, a corresponding end of the second platform section such that the first platform section is deflectable independent of the second platform section.

12. The data storage cartridge of claim 11, wherein the end of the first platform section is curved.

13. The data storage cartridge of claim 12, wherein the second-major surface of the first platform section at the end is spatially beyond an outer surface of the first connection pad.

* * * * *